I. W. NONNEMAN.
PIPE CUTTER.
APPLICATION FILED OCT. 29, 1912.
1,076,223.
Patented Oct. 21, 1913.
2 SHEETS—SHEET 1.
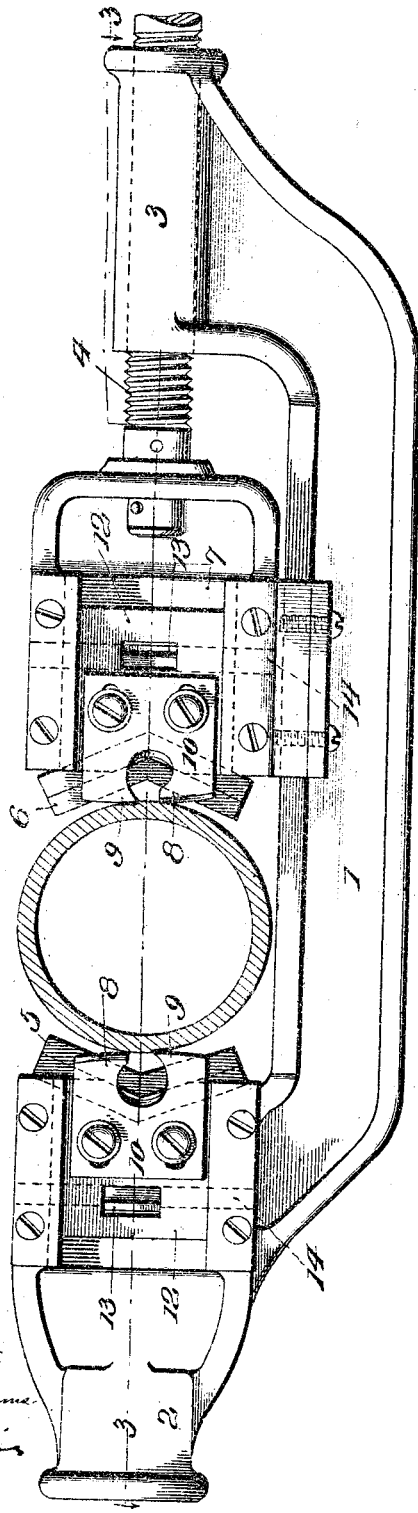
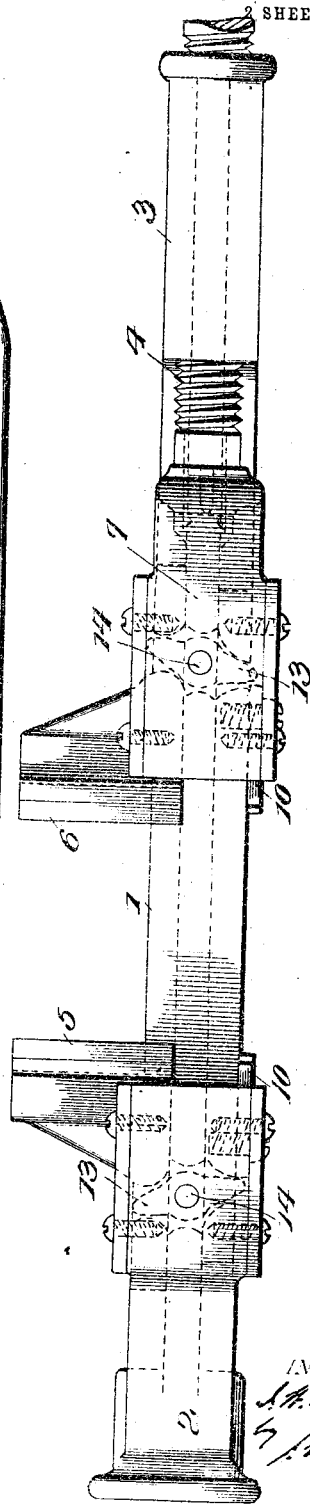
WITNESSES
INVENTOR
Attorney

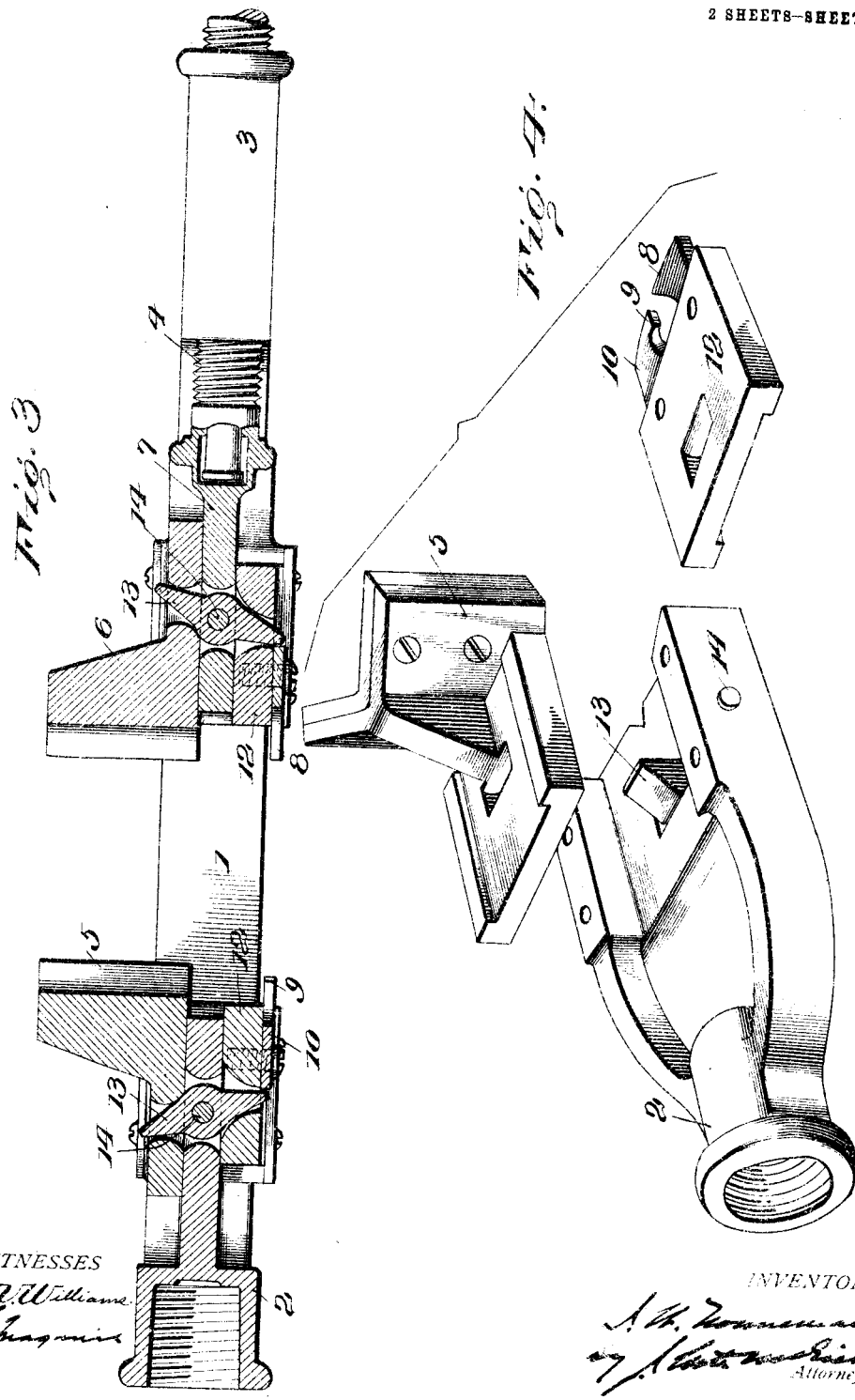

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

PIPE-CUTTER.

1,076,223.      Specification of Letters Patent.      Patented Oct. 21, 1913.

Application filed October 29, 1912. Serial No. 728,416.

*To all whom it may concern:*

Be it known that I, IRA W. NONNEMAN, of Warren, in the county of Trumbull and State of Ohio, have invented certain new and useful Improvements in Pipe-Cutters; and I do hereby declare the following to be a full, clear, and exact description of the invention, such as will enable others skilled in the art to which it appertains to make and use the same.

The primary object of this invention is to provide an extremely simple and inexpensive pipe-cutter wherein the cutting mechanism will be positively forced into engagement with the pipe by the resistance of the latter to the chuck or pipe-engaging jaws.

In the accompanying drawings, Figure 1 is an elevation of a pipe cutter embodying my invention. Fig. 2 is a plan view. Fig. 3 is a section on line 3—3, Fig. 1. Fig. 4 is a perspective view of detached parts.

Referring to the drawings, 1 designates a frame having at one end a socket 2 for a relatively fixed handle rod, and at the other end an internally threaded elongated socket 3 for a longitudinally adjustable handle rod 4.

The pipe-clamping means comprises two jaws or chuck members 5 and 6, the former having a plate portion slidable in guides on one side of frame 1, and the other having a corresponding plate portion slidable in guides on one side of a block 7 which in turn is slidable on the frame. The inner end of handle rod 4 is secured to this block so that the latter may be moved back and forth on the frame by turning the rod.

The cutting mechanism is shown as composed of two knives 8 and complementary guides 9, each knife and its respective guide being formed from a single plate 10 after the manner disclosed in the application for patent of Alfred F. Howe, filed Oct. 30, 1911, Serial No. 657,564. The plates 10 are shown as secured to two plates 12, of which one is slidable in guides on one side of the frame, and the other in guides on the corresponding side of block 7, with the result that the cutting and guiding plates are in the same plane on one side of the frame and the pipe engaging jaws are in a common plane on the other side.

Within the frame and also within block 7 are located short levers 13 movable on planes at right-angles to the plane of movement of the cutters and jaws. These levers are fulcrumed on pins 14, and the ends of said levers project into slots formed in the plate portions of the jaws and also in the knife-carrying plates 10. Outward pressure on the jaws will, through the agency of the levers, cause the plates 10 and their knives and guides to move inwardly toward each other, so that in applying the tool to a pipe, as the jaws engage the latter the resistance occasioned thereby forces the knives against the pipe.

In practice, the jaws are separated sufficiently to permit the tool to be positioned on the pipe by turning rod 4, and after the tool is properly presented, said rod is turned to bring the jaws and knives into engagement with the pipe. The cutting is effected in the usual way, namely, by turning the tool on the pipe, and as the cutting progresses, the adjusting rod is turned from time to time, but inasmuch as the jaws after being set cannot move any closer to each other, the resistance is communicated to the knife-carrying plates through the agency of the levers, with the result that the knives and their guides are kept up to their work until the cutting operation is completed.

I claim as my invention:—

1. A pipe cutting tool comprising pipe-clamping jaws between which there is a relative adjustment as the tool is being applied to a pipe, said jaws maintaining a fixed relation to each other during the cutting operation, cutting means coöperating with said jaws and means operatively connecting the same so that the jaws will be forced into engagement with the pipe by the resistance offered by the latter to the jaws, and means for adjusting the cutting means as the cutting operation progresses.

2. A pipe cutter comprising a frame having oppositely-disposed jaws between which there is a relative adjustment, means for effecting such adjustment, opposed cutters slidably mounted relatively to said jaws, and means intermediate of each jaw and its respective cutter for forcing the latter into engagement with a pipe by the resistance of the latter to the jaws.

3. A pipe-cutter comprising a frame, oppositely disposed slidable jaws, cutters coöperating with said jaws, each cutter being slidably mounted on a plane paralleling the sliding movement of the jaws, means for causing the cutters to be moved in opposite direction to the jaws, and means for effecting a relative bodily movement between the jaws and the cutters.

4. A pipe-cutter comprising a frame, oppositely disposed slidable jaws, cutters cooperating with said jaws, each cutter being slidable on a plane paralleling the sliding movement of the jaws, means actuated by the resistance of the jaws in engaging a pipe for causing the cutters to be moved toward the pipe, and means for effecting a relative bodily movement between the jaws and the cutters.

5. A pipe-cutter comprising a frame, oppositely disposed slidable jaws, cutters cooperating with said jaws, each cutter being slidable on a plane paralleling the sliding movement of the jaws, levers movable on planes at right angles to the planes of movement of the jaws and cutters and in engagement with the latter for causing the cutters to be moved toward the pipe by the resistance of the pipe to the jaws, and means for effecting a relative bodily movement between the jaws and the cutters.

6. A pipe-cutter comprising a frame, a jaw slidably mounted thereon, a cutter slidable on a plane paralleling the plane of movement of the jaw, a lever mounted in said frame and movable on a plane at right angles to the planes of movement of the jaw and cutter, said lever engaging said jaw and cutter and designed to move the latter toward a pipe by the resistance of the pipe to the jaw, a second jaw in line with the first-mentioned jaw, and a second cutter in line with the first-mentioned cutter, and means for effecting a relative bodily movement between the two jaws and two cutters.

7. A pipe-cutter comprising a frame, a jaw slidably mounted thereon, a cutter slidable on a plane paralleling the plane of movement of the jaw, a lever mounted in said frame and movable on a plane at right-angles to the planes of movement of the jaw and cutter, a block slidable on said frame, a rod for adjusting said block, a jaw slidably mounted on said block in line with the first-mentioned jaw, a cutter slidable on said block in the plane of the first-mentioned cutter, and a lever mounted in said block and engaging the second mentioned jaw and cutter, said levers forcing said cutters toward a pipe by the resistance of the latter to the jaws.

8. A pipe-cutting tool comprising opposed jaws and opposed cutters, means for effecting a relative movement between the sets of jaws and cutters, each jaw and each cutter being slidable in parallel planes, and rocking members movable on planes at right angles to the planes of movement of the jaws and cutters, such rocking members engaging each a jaw and a cutter, said cutters being forced inwardly by the resistance of a pipe to the jaws.

I testimony whereof, I have signed this specification in the presence of two subscribing witnesses.

IRA W. NONNEMAN.

Witnesses:
M. W. BECHSEL,
A. J. SUTCLIFFE.